United States Patent [19]
Devitt et al.

[11] 4,356,197
[45] Oct. 26, 1982

[54] EDIBLE OIL

[75] Inventors: Michael T. Devitt, Brentwood; John B. Rossell, Loughton, both of England

[73] Assignee: Lever Brothers Company, New York, N.Y.

[21] Appl. No.: 232,799

[22] Filed: Feb. 9, 1981

Related U.S. Application Data

[63] Continuation of Ser. No. 19,067, Mar. 9, 1979, abandoned.

[30] Foreign Application Priority Data

Mar. 14, 1978 [GB] United Kingdom ............... 10096/78

[51] Int. Cl.$^3$ ................................................ A23B 7/16
[52] U.S. Cl. ........................................ 426/89; 426/102; 426/302; 426/313; 426/611; 260/409
[58] Field of Search .................. 426/89, 99, 102, 103, 426/302, 307, 308, 309, 546, 601, 611, 313; 260/409

[56] References Cited

U.S. PATENT DOCUMENTS

| | | | |
|---|---|---|---|
| 1,900,295 | 3/1933 | McDill | 426/308 |
| 3,444,218 | 5/1969 | Tribble et al. | 426/546 X |
| 3,804,867 | 4/1974 | Gooding et al. | 260/409 |
| 4,038,295 | 7/1977 | Stern et al. | 260/409 |
| 4,039,470 | 8/1977 | Kalmar | 426/308 X |
| 4,163,750 | 8/1979 | Bird et al. | 260/409 |

OTHER PUBLICATIONS

Wisniak, J. et al., "Hydrogen Solubility in Jojoba Oil", JAOCS 51, 1974, pp. 482–485.

Primary Examiner—Robert A. Yoncoskie
Attorney, Agent, or Firm—James J. Farrell

[57] ABSTRACT

Improved coating compositions for foodstuffs such as chocolate and dried fruit comprise jojoba oil which is hydrogenated either substantially completely and used in solution in a volatile solvent such as acetone, or partially to a liquid which, while remaining clear for at least 24 hours at 25° C. or below, provides a greatly improved stability to the coated foodstuff compared with the unhydrogenated oil. The partially hydrogenated oil is preferably of low trans-content and may have an Iodine Value as little as 2 units below that of the original oil. Preferably it is obtained by hydrogenation at a temperature below 125° C. using a fresh, unsulphured metal hydrogenation catalyst.

4 Claims, No Drawings

EDIBLE OIL

This is a continuation application of Ser. No. 19,067, filed Mar. 9, 1979, now abandoned.

Prior Art

The oiling of dried fruit for preserving is described by Goldenberg (Chem. & Ind., Nov. 6, 1976 p. 956). The origin and composition of jojoba oil are described in Kirk-Othmer 22, p. 166 and Prog. Chem. Fats and Other Lipids 15, pp. 167–218, Pergamon 1977.

In J.A.O.C.S. 51 482–5 (1974) the waxing of fruit is suggested using a wax obtained by partial hydrogenation of jojoba oil. The marked stability during storage of the original oil and the solid products obtained by hydrogenating the oil either completely to a hard solid melting at 70° C. or partially to a softer fat are disclosed in Ind. Eng. Chem. Prod. Res. Div. 14 No. 4 (1975) p. 226. No reference appears however to the improvement in stability effected by the hydrogenation of the oil and the progression in hydrogenation described in the latter reference does not include the isolation and examination of intermediate hydrogenation products. No reference appears in any of the cited art to the use of the fully hydrogenated product for coating foodstuffs.

SUMMARY OF THE INVENTION

The present invention is based upon the selection from among the hydrogenated products of jojoba oil of two varieties for coating foodstuffs. One of these is the fully hydrogenated product for which particular benefits apply in coating chocolate confectionery arising from its very hard nature and resemblance to beeswax, carnauba wax and the like which have been used for this purpose but which are less desirable for their high cost and/or limited availability. The other variety of hydrogenated jojoba oil which is used in accordance with the invention remains a clear liquid which can be used as such for coating purposes and which combines this advantage with a marked enhancement of oxidative stability in comparison with the unhydrogenated oil. The extent of this enhancement is astonishing in relation to the very limited degree of hydrogenation which is all that is necessary to provide the improvement, a reduction of Iodine Value of only 2 units being usually sufficient to provide a marked improvement while the oil remains in a clear condition when standing for at least 24 hours at 25° C.

GENERAL DESCRIPTION

This invention relates to edible coating compositions, their use and preparation. In particular the invention relates to compositions based on hydrogenated jojoba oil for this purpose.

A variety of foodstuffs is coated with agents for preservative purposes or for appearances' sake. For example, sultanas are coated by oiling to preserve them from one season to another and thus improve their shelf-life. The effect of the oiling, for which mineral and glyceride vegetable oils have been used, appears to be to prevent drying out by loss of moisture and thus the crystallisation of sugars on the surface which otherwise appears, and inhibit the growth cycle of insect or microbiological life which may be present. Certain packing advantages also result from the effect of the coating in preventing the tendency of the fruit to aggregate into large clumps.

A coating is also applied to impart high gloss to chocolates, in this case the coating material usually consisting of a small amount of beeswax applied by tumbling the individual chocolates in a small amount of the wax.

Jojoba oil is a natural oil extracted from the seeds of a shrub, *Simmonsia californica*, found in Arizona and California in the United States and Sonora in Mexico. The oil is not a glyceride oil but consists substantially of esters of $C_{20}$ and $C_{22}$ straight-chain monocarboxylic acids and monohydric alcohols, and for this reason is classed as a wax.

A particular aspect of the invention is based upon the discovery that certain hydrogenated products of jojoba oil may be applied as a very stable coating to improve the shelf-life or appearance of foodstuffs. The present invention therefore provides a method of coating foodstuffs comprising applying thereto a composition comprising jojoba oil which is hydrogenated either substantially fully to a melting point of at least 70° C. or partially to a liquid remaining clear for at least 24 hours at 25° C. or below.

The coating compositions used in the invention for oiling fruit and serving as a carrier for flavour agents are normally liquid, that is to say they may be sprayed at temperatures below 25° C. They may consist of the partially hydrogenated jojoba oil alone, or the partial or completely hydrogenated oil products diluted with a pharmacologically acceptable volatile solvent such as acetone which rapidly evaporates from the surface of the coated material leaving a waxy coating of the hydrogenated jojoba oil. The partially hydrogenated jojoba oil preferably remains clear for at least 24 hours at 20° C. and even below and may therefore be used per se without a solvent.

Preferably the Iodine Value of partially hydrogenated jojoba oil in accordance with the invention is at least 20, particularly at least 40, more especially at least 60. Substantial improvements in the stability of jojoba oil may be obtained for a decrease of as little as 2 Iodine Value units below that of the naturally-occurring oil, which is normally between 80 and 85. The natural fluidity of the oil may be preserved to yield a product like the original oil, remaining clear for at least 24 hours at temperatures of 25° C. or below, even 20° C. or below, in products of the oil with low trans-content of less than 20, by subjecting the oil to such hydrogenation conditions that trans-isomer formation is minimised. This may be achieved in accordance with a further feature of the invention by use of a fresh, active unsulphured metal catalyst and by the choice of a low hydrogenation temperature, below 125° C. Under these conditions IV reductions of about 2 units are sufficient to increase the oxidative stability of the oil without deleterious melting point increase. The partially hydrogenated compositions may optionally in addition be separated into fractions of different melting point to separate higher-melting components, in order further to modify the properties of the product. Trans-content % is measured by the method described in J.A.O.C.S. 1959, 36, 627–31, calculated as elaidic acid. Dilatations measured according to the method described in British Pat. No. 859,769, except that the samples are stabilised by standing in the dilatometer for 16 hours at 0° C., provide a convenient measure of clarity of the oil and its hydrogenated products in the temperature range up to 25° C. Preferably the partially hydrogenated oil exhibits a range at 10° C. of 750 to 900. and at most 325 at 20° C.

Substantially fully hydrogenated jojoba oil is a solid with a melting point upwards of 70° C. and may be used in the process of the invention as a substitute for beeswax or carnauba wax in panning techniques for imparting a high gloss to chocolate or other confectionery products by tumbling with a small amount of the wax dissolved in a volatile alcohol.

The partially hydrogenated jojoba oil used in the invention preferably exhibits an oxidative stability providing less than 25 mm Hg pressure drop in 20 hours at 100° C., measured by an Accelerated Induction Period Test at substantially atmospheric pressure, and particularly 1–20 mm Hg under the same conditions. In this test, 300 mls of the oil is mechanically shaken in a round bottomed flask 500 ml in capacity fitted with a steam jacket to maintain the flask at 100° C. during the test and connected to a manometer pen recorder to recording the absorption of oxygen from the air space above the oil.

Preferably the composition comprising hydrogenated jojoba oil also contains an antioxidant, particularly tocopherol. This may be present in the form of vegetable lecithin. This contains naturally-occurring tocopherol and is therefore an effective antioxidant additive provided that it is not previously bleached by hydrogen peroxide or other oxidant material neutralising the antioxidant effect. Soybean lecithin is preferred, in an amount of 1% or less, preferably 0.5% or less, particularly approximately 0.1%.

EXAMPLE 1

Refined jojoba oil having an Iodine Value of 84.5 was progressively hydrogenated at 95° to 115° C. and 36 psig in the presence of 1% of a catalyst comprising freshly reduced nickel on Kieselguhr containing 20% nickel, in a Parr autoclave equipped with a stirrer rotating at 500 rpm. The rate of hydrogenation under these chosen conditions was very slow, and only a small amount of trans-isomerisation took place. Samples were removed at intervals and evaluated for Iodine Value and solids content by dilatometry. Readings were taken at 5° C., 10° C., 15° C. and 20° C., with equilibration for 30 minutes after each measurement.

TABLE 1

| | Sample | | | |
|---|---|---|---|---|
| | 1 (Starting Material) | 2 | 3 | 4 |
| IV | 84.5 | 80.4 | 82.0 | 77.6 |
| $D_0$ | 1970 | 2015 | 2000 | 2175 |
| $D_5$ | 1585 | 1630 | 1685 | 1810 |
| $D_{10}$ | 720 | 775 | 815 | 900 |
| $D_{15}$ | 55 | 50 | 180 | 475 |
| $D_{20}$ | 45 | 45 | 100 | 325 |

Each of the hydrogenated samples, together with a sample of the unhydrogenated jojoba oil (sample 1) was stored overnight at 20° C. The oil itself together with sample 2 remained clear of solids at 18° C. for 24 hours, while samples 3 and 4 were increasingly cloudy. At 25° C. all the samples remained clear.

The oil and the hydrogenated samples were neutralised, bleached with bleaching earth and deodorised by steam treatment for 5 hours at 180° C. under reduced pressure. 0.1% of unbleached American soya lecithin was added and the compositions examined for stability by the described Accelerated Induction Period Test, which is a modification of the Sylvester Test. The hydrogenated samples showed a substantial improvement in oxidative stability over the oil itself and over various other liquid vegetable oil products.

EXAMPLE 2

A further sample of jojoba oil, hydrogenated under similar conditions to those described in Example 1, gave a product of Iodine Value 83.4 and after treatment as described in Example 1 was similarly tested, with 0.09% of the lecithin added. The resulting oil was again of very light colour, free from odour and had a pleasant almost bland flavour. The characteristics analysis showed the following results:

TABLE 2

| | Hydrogenated jojoba |
|---|---|
| IV | 83.4 |
| Accelerated Induction Period Test (pressure drop mm of Hg in 20 hours at 100° C. φ) | 2 |
| *Swift Peroxide Value after 24 hours | 3.9 |
| Swift Peroxide Value after 48 hours | 2.7 |
| Swift Peroxide Value after 96 hours | 6.7 |
| $D_0$ | 2040 |
| $D_5$ | 1640 |
| $D_{10}$ | 765 |
| $D_{15}$ | 490 |
| $D_{20}$ | 55 |
| Lovibond colour R/Y | 0.6/4.7 (5¼") |

φ Similarly treated unhydrogenated jojoba oil, 33 mm Hg in 15 hours.
*Oil & Soap J. 1933, 10, 105.

These results showed a substantial improvement over a proprietary coating oil of vegetable origin. Each of the hydrogenated products of Examples 1 and 2 could be sprayed onto dried sultanas, the flavour and taste of which remained unimpaired in comparison with unsprayed fruit, whereas the shelf-life was considerably improved. The sprayed sultanas did not clump together or become encrusted with sugar by a loss of moisture.

What is claimed is:

1. A method of preserving foodstuffs by applying an inert coating thereto said coating consisting essentially of a hydrogenated jojoba oil product applied in the form of a liquid at temperatures below 25° C. wherein said product comprises jojoba oil hydrogenated with a fresh nickel catalyst at a hydrogenation temperature below 125° C. to an iodine value of at least 60 and a trans content below 20; which exhibits an oxidative stability providing from 1 to 20 mm Hg pressure drop by an Accelerated Induction Period Test in 20 hours at 100° C. measured at about 1 atmosphere pressure; and which is a liquid remaining clear for at least 24 hours at 20° C.

2. Foodstuffs including dried fruit and chocolate confectionery whenever coated by a process as claimed in claim 1.

3. Partially hydrogenated jojoba oil which remains clear for at least 24 hours at 25° C. and which exhibits an oxidative stability providing from 1 to 20 mm Hg pressure drop in 20 hours at 100° C. as measured by an Accelerated Induction Period Test at about 1 atmosphere pressure, said oil having an iodine value of at least 60 and a trans content below 20 and being formed by hydrogenation at a temperature below 125° C. using an active nickel catalyst.

4. Foodstuffs including dried fruit coated with a composition as claimed in claim 3.

* * * * *